(12) United States Patent
Goldring et al.

(10) Patent No.: US 6,553,391 B1
(45) Date of Patent: Apr. 22, 2003

(54) SYSTEM AND METHOD FOR REPLICATING EXTERNAL FILES AND DATABASE METADATA PERTAINING THERETO

(75) Inventors: Robert David Goldring, Morgan Hill, CA (US); Joshua Wai-Ho Hui, Campbell, CA (US); Inderpal Singh Narang, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 242 days.

(21) Appl. No.: 09/590,637

(22) Filed: Jun. 8, 2000

(51) Int. Cl.[7] ............................................. G06F 17/30
(52) U.S. Cl. ..................... 707/203; 707/204; 707/205
(58) Field of Search ................................. 707/203, 204, 707/205

(56) References Cited

U.S. PATENT DOCUMENTS

| | | | |
|---|---|---|---|
| 5,276,835 A | * 1/1994 | Mohan et al. | 711/144 |
| 5,537,574 A | * 7/1996 | Elko et al. | 711/113 X |
| 5,588,147 A | 12/1996 | Neeman et al. | 395/601 |
| 5,613,113 A | * 3/1997 | Goldring | 707/202 |
| 5,715,454 A | * 2/1998 | Smith | 707/203 |
| 5,757,669 A | 5/1998 | Christie et al. | 364/514.006 |
| 5,819,272 A | 10/1998 | Benson | 707/8 |
| 5,842,214 A | * 11/1998 | Whitney et al. | 707/10 |
| 5,878,434 A | * 3/1999 | Draper et al. | 707/202 |
| 5,918,229 A | * 6/1999 | Davis et al. | 707/10 |
| 5,983,217 A | 11/1999 | Khosravi-Sichani et al. | 707/3 |
| 6,029,160 A | * 2/2000 | Cabrera et al. | 707/1 |
| 6,088,694 A | * 7/2000 | Burns et al. | 707/8 |
| 6,119,131 A | * 9/2000 | Cabrera et al. | 707/203 |

* cited by examiner

*Primary Examiner*—Charles Rones
(74) *Attorney, Agent, or Firm*—John L. Rogitz

(57) ABSTRACT

A system and method for replicating files in a source file system that is linked to a source DBMS which stores metadata pertaining to files in the source file system. The files and metadata are replicated to a target system having a target file system linked to a target DBMS. File references are also mapped from the source to the target. Also, only the most recent consistent version of files that have changed at the source and that have had insert or update references in the source DBMS are copied over to the target file system, thereby minimizing unnecessary replications.

21 Claims, 4 Drawing Sheets

SYSTEM AND METHOD FOR REPLICATING EXTERNAL FILES AND DATABASE METADATA PERTAINING THERETO

BACKGROUND OF THE INVENTION

1. Field of the Invention

The present invention relates generally to using a database management system (DBMS) to manage files that are external to the DBMS, and more particularly to systematically replicating both external files and database metadata pertaining thereto.

2. Description of the Related Art

The present assignee's "DataLinks" component of its commercial relational database management system (DBMS) DB2 allows large objects such as text, graphics, audio, and video to be stored as files in file systems, with the metadata of the files being stored in the DBMS and with the files linked to the DBMS. In this way, management of file data in connection with the metadata and access control of the files advantageously is provided by the DBMS. "DataLinks" is the subject of U.S. Pat. No. 6,029,160, incorporated herein by reference.

The present invention recognizes that in many current applications, particularly in e-commerce, so-called "extended enterprises" are becoming commonplace. In an extended enterprise, for security, performance, and availability reasons, each of, say, two partners has its own file system linked to its own respective DBMS for access control. An example of an extended enterprise might be an automotive manufacturer that has suppliers who collaborate on product designs.

The present invention further understands that since each partner might be authorized to change, add, or delete a file, to ensure consistency the changes one partner makes to a file should be replicated into the other partner's file system and DBMS. Moreover, the present invention recognizes that this reconciliation, which should occur on a relatively frequent basis, should include both file system data and metadata, which in turn requires that the replication occur in a systematic and synchronized way. Also, while some operations might require DBMS metadata replications, such as changes to references to a file that do not modify the file itself or updates to DBMS columns other than the column containing the file reference, file replication is not required. Accordingly, the present invention provides a method and system for the systematic, synchronized replication of files and corresponding DBMS metadata from a source system to a target system, and which preferably replicates only necessary file changes from the source to the target.

SUMMARY OF THE INVENTION

The invention includes a computer system for undertaking the inventive logic set forth herein. The invention can also be embodied in a computer program product that stores the present logic and that can be accessed by a processor to execute the logic. Also, the invention is a computer-implemented method that follows the logic disclosed below.

Accordingly, in one aspect a computer-implemented method is disclosed for replicating data in at least one source system having a source file system linked to a source DBMS to at least one target system having a target file system linked to a target. The method includes identifying a changed file in the source file system by, e.g., executing an INSERT operation in the associated DBMS if the file initially has no reference in the DBMS, or for files having a reference in the DBMS, executing a DELETE/UPDATE operation to unlink the file for revision thereto and then executing an INSERT/UPDATE to relink the file to the DBMS. In any case, the changed file has an associated reference stored in the source DBMS. The changed file is replicated to the target file system, with the reference being mapped to the target.

In one preferred embodiment, the replication of the changed file is synchronized with the mapping of the reference, to ensure that the state of the target file system is consistent with the state of the target. The preferred method for undertaking the generating step includes accessing at least a first mapping table that includes a server mapping identifier column, a source name column, and a target name column. Also, a second mapping table that includes a server mapping identifier column, a source file prefix column, and a target file prefix column is accessed. A file reference with associated pathname prefix and file server portion is received, and a reference row in the first mapping table is identified that has a value in the source name column equal to a value of the file server portion of the file reference. The value of the source name column in the reference row is replaced with the value in the target name column in the reference row. Then, a row is identified in the second mapping table that conforms to two conditions, namely, it has a value in the server mapping identifier column equal to the value in the server mapping identifier column in the reference row, and the row in the second table further has, in the source prefix column, a value matching portion having a longest match with the pathname prefix of the file reference. The pathname prefix of the file reference is then replaced with a value of the target prefix column in the row of the second mapping table, essentially generating a new file reference from an original file reference. Subsequently, file content can be retrieved using the original reference, and then stored using the new file reference.

To avoid unnecessary file replication, only a latest consistent version of a file is replicated at the target file system, and only when an INSERT or UPDATE is performed on a column in the source DBMS referencing the file and the file has been changed in the source file system.

In another aspect, a computer system includes at least one source file system, and at least one source DBMS linked to the source file system to provide management thereof. The system also includes at least one target file system and at least one target linked to the target file system to provide management thereof. Changes in the source file system and underlying changes in the source DBMS are replicated to the target file system and target, respectively in synchronization by the present invention.

In still another aspect, a computer program product has computer usable means thereon that are executable by a digital processing apparatus to replicate files from a source file system linked to a source DBMS to a target file system linked to a target. The program product includes computer readable code means for replicating at the target file system only a latest consistent version of a file at the source file system, only if the file has been changed at the source file system and an insert or update is performed on a file reference associated with the file.

In another aspect, a computer program product is disclosed that includes computer usable means that can be executed by a digital processing apparatus. The program product includes computer readable code means for mapping at least one file reference in a source DBMS to a target linked to a target file system.

The details of the present invention, both as to its structure and operation, can best be understood in reference to the accompanying drawings, in which like reference numerals refer to like parts, and in which:

DETAILED DESCRIPTION OF THE PREFERRED EMBODIMENTS

Figure 1:
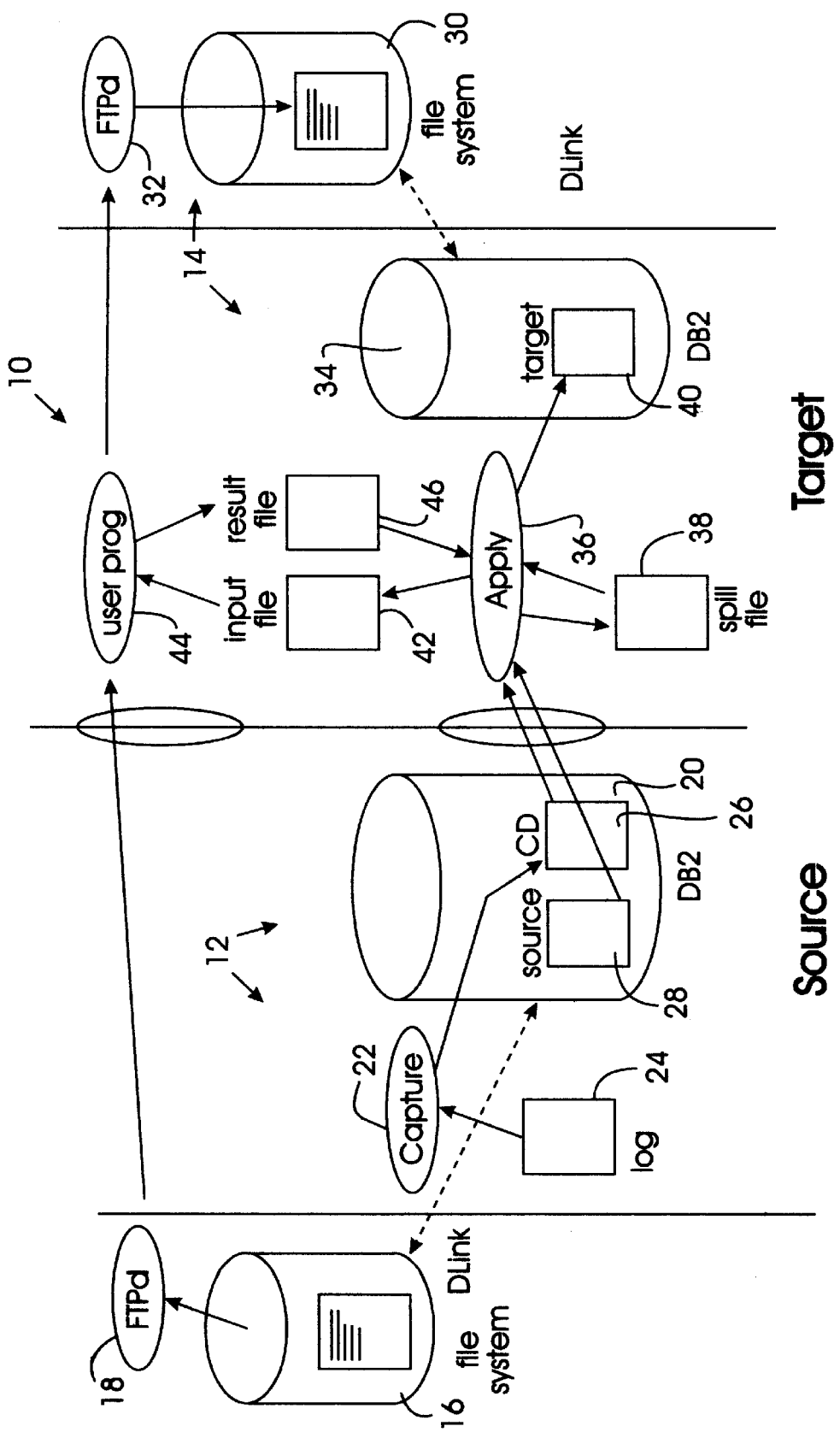
FIG. 1 is a block diagram of the architecture of the present system.

Referring initially to FIG. 1, a computer system 10 is shown that includes a source system 12 and a target system 14. While a single source system and target system are shown, the principles advanced herein are applicable to systematically propagating changes of multiple managed storage systems in synchrony from a single source system to plural target systems, or from plural source systems to a single or plural target systems.

As shown, the source system 12 includes a source file system 16 with file transfer mechanism 18. In one non-limiting example, the file transfer mechanism 18 is a file transfer protocol (FTP) mechanism. Further, the source system 12 includes a source database management system (DBMS) 20. In one non-limiting example, the source DBMS 20 is a DB2 system having the above-referenced "DataLinks" management software incorporated therein, as modified by the present disclosure. Accordingly, the DBMS 20 includes metadata pertaining to files in the file system 16 for management thereof. Alternatively, the DBMS can be other types of DBMS which have DataLinks management software.

In the preferred embodiment, the source DBMS 20 includes, among other things, a data capture module 22 which, in one non-limiting example, is an enhanced DPropR "Capture" module disclosed in U.S. Pat. No. 5,613,113, incorporated herein by reference, that accesses a database change log 24. As disclosed in further detail below, the data capture module 22 can write data to a change data table 26 in the source DBMS 20. The source DBMS 20 also includes a source table 28 that includes metadata pertaining to source files.

By "file reference" is meant a database reference to a file in the associated file system, in the case of the source system 12, a file in the source file system 16. A file reference preferably includes but is not limited to two elements. The first is the name of the file server storing the file, and the second element is the name of the path to the file. For instance, a file reference, also referred to as a "link", might be "HTTP://FS1.ALMADEN.IBM.COM/data/images/proj1/file.avi", in which case the file server name would be "HTTP://FS1.ALMADEN.IBM.COM" and the file pathname would be "/data/images/proj1/file.avi."

Additionally, the target system 14 includes a target file system 30 with file transfer mechanism 32. In one non-limiting example, the file transfer mechanism 32 is a file transfer protocol (FTP) mechanism. Further, the target system 14 includes a target database management system (DBMS) 34. In one non-limiting example, the target DBMS 34 is a DB2 system having the above-referenced "DataLinks" management software incorporated therein, as modified by the present disclosure. Accordingly, the DBMS 34 includes metadata pertaining to files in the file system 30 for management thereof. Less preferably, the target need not be a DBMS, but rather can be, e.g., a LOTUS1-2-3 program running on a laptop computer, or even a personal digital assistant (PDA).

The target DBMS 34 includes, among other things, a data propagation module 36 which, in one non-limiting example, is an enhanced DPropR "Apply" module that can temporarily store data in a spill file 38. The basic DPropR "Apply" module is disclosed in U.S. Pat. No. 5,440,735, incorporated herein by reference. As disclosed in further detail below, the data propagation module 36 can write data to a target table 40 that includes data pertaining to target file references. Further, the data propagation module 36 can write data to an input file 42 that is associated with a user program 44 that functions in accordance with disclosure below to propagate files from the source file system 16 to the target file system 30. The user program also performs file reference mapping from the source system to the target system and records the mapped target file references in a result file 46 that is accessible to the data propagation module 36.

Having described the overall architecture of the system 10, it is to be understood that the various file systems, DBMS, and user programs can reside on one or more computers. As intended herein, one or more of the computers can be a server computer made by International Business Machines Corporation (IBM) of Armonk, N.Y. Other digital processors, however, may be used, such as personal computers, laptop computers, mainframe computers, palmtop computers, personal assistants, or any other suitable processing apparatus can be used.

In any case, the processor of each computer accesses the appropriate modules and programs to undertake the logic of the present invention, which may be executed by a processor as a series of computer-executable instructions. The instructions may be contained on a data storage device with a computer readable medium, such as a computer diskette having a computer usable medium with computer readable code elements stored thereon. Or, the instructions may be stored on random access memory (RAM) of the computer, on a DASD array, or on magnetic tape, conventional hard disk drive, electronic read-only memory, optical storage device, or other appropriate data storage device. In an illustrative embodiment of the invention, the computer-executable instructions may be lines of JAVA code.

Indeed, the flow charts herein illustrate the structure of the logic of the present invention as embodied in computer program software. Those skilled in the art will appreciate that the flow charts illustrate the structures of computer program code elements including logic circuits on an integrated circuit, that function according to this invention. Manifestly, the invention is practiced in its essential embodiment by a machine component that renders the program code elements in a form that instructs a digital processing apparatus (that is, a computer) to perform a sequence of function steps corresponding to those shown.

Figure 2A:
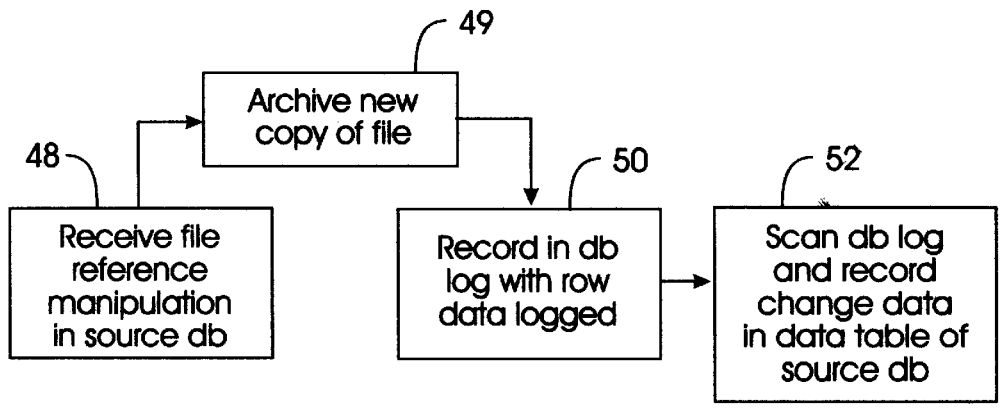
FIG. 2A is a flow chart showing the overall replication logic in the source system.

Now referring to FIG. 2A, the overall logic of the present invention in the source system can be seen. Commencing at block 48, a file reference manipulation is received in the source DBMS 20 and is recorded in the log 24. Such a file reference manipulation can be caused by an SQL INSERT, DELETE, or UPDATE operation pursuant to file changes and other operations in the source file system 16 in accordance with DataLinks principles set forth in the above-referenced patent. At block 49, since the existing DataLinks triggers the archiving of a new copy of a file every time the file reference changes, a new copy of the file is archived at block 49. Preferably, the operation and row of data pertaining thereto are logged at block 50, along with the version number of the file. Moving to block 52, the log 24 is scanned by the data capture module 22, and the changes therein are recorded in the change data table 26, along with the version number.

Figure 2B:
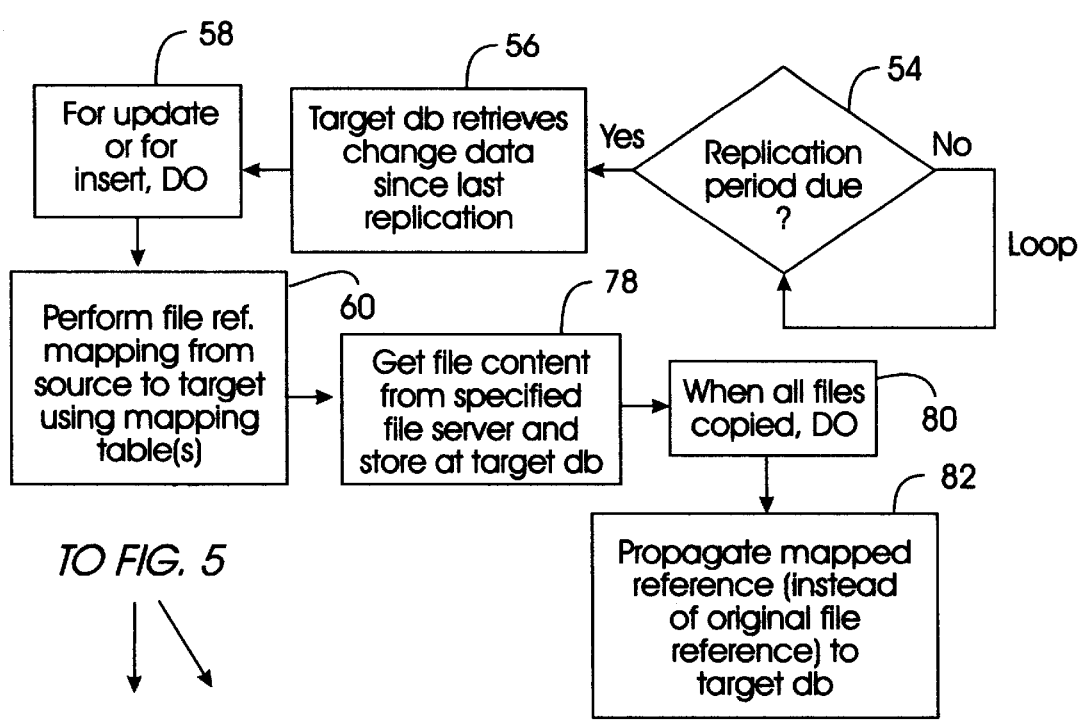
FIG. 2B is a flow chart showing the overall replication logic in the target system.

FIG. 2B shows the logic of the target system. At decision diamond 54, it is determined whether the replication period has elapsed, i.e., whether reconciliation between the source and target systems 12, 14 is due. When it is time to replicate, the logic moves to block 56, wherein the data propagation module 36 of the target DBMS 34 retrieves data by accessing the change data table 26 for a differential refresh, used most of the time, or the source table 28 for a full refresh, used during initialization wherein all data in the source table is propagated to the target table. The data in the change data table 26 includes only changes since the previous replication associated by version number.

Once the target system 14 has retrieved the above-mentioned data from the source system 12, an empty spill file referred to herein as the "input" file 42 is created, and a DO loop is entered at block 58 for each file reference associated with an INSERT operation that has been performed pursuant to adding a new file to the source file system 16. Also, the DO loop is entered for each file reference associated with an UPDATE operation that has been performed pursuant to, e.g., changing a file in the source file system 16. It is to be understood that an UPDATE operation can be considered as a DELETE followed by an INSERT. The references are added to the input file 42.

Figures 3, 4, 5:
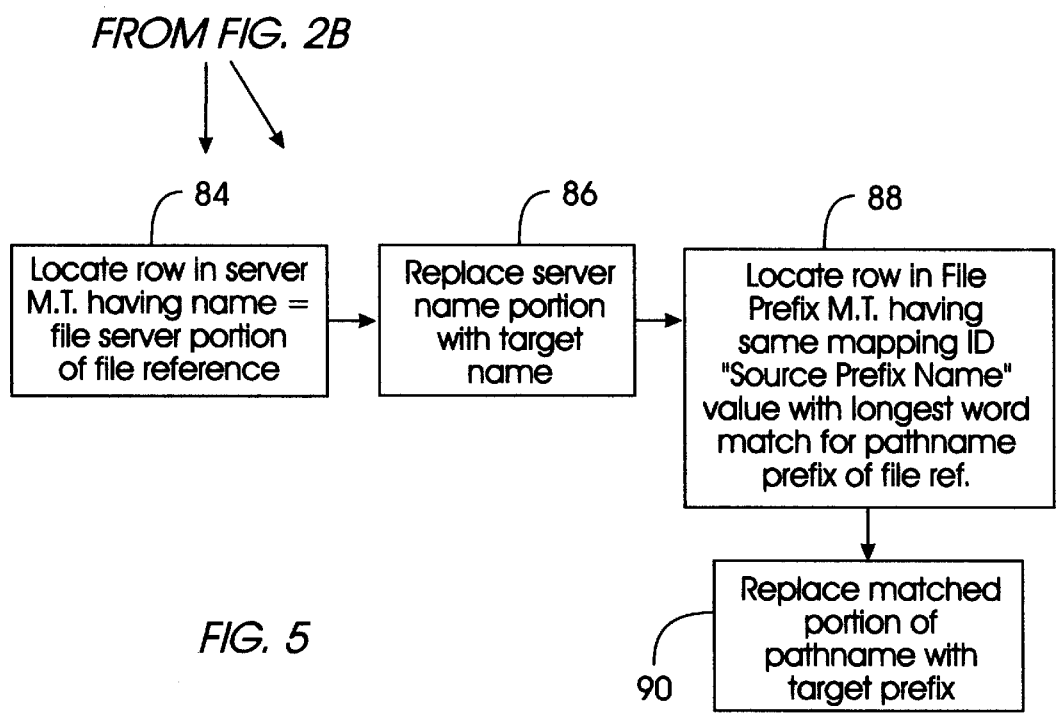
FIG. 3 is a schematic rendering of the Server mapping table.
FIG. 4 is a schematic rendering of the File Prefix mapping table.
FIG. 5 is a flow chart showing the detailed logic of mapping a file reference from the source to the target.

The DO loop enters block 60 to invoke the user program 44 to map the file reference from the source DBMS 20 to the target DBMS 34 using the mapping tables shown in FIGS. 3 and 4. The details of this mapping will be discussed further below, but referring briefly to FIGS. 3 and 4 for an understanding of the structure of the presently preferred but non-limiting mapping tables, in FIG. 3 a server mapping table 62 is shown. The server mapping table 62 includes a server map identification column 64, a source file server name column 66, and a target file server name column 68. In the presently preferred implementation, the server map ID is a server mapping identifier which uniquely identifies a distinct source server to target server mapping, while the source and target server names are the names of a source file server and a corresponding target file server, respectively.

FIG. 4 on the other hand shows a file prefix mapping table 70 that, like the server mapping table 62, includes a server map identification column 72. However, unlike the server mapping table 62, the file prefix mapping table 70 includes a source prefix name column 74, and a target prefix name column 76. The source prefix name is the name of a valid file prefix in the source file system 16, such as "/data/images". In contrast, the target prefix name is the name of a valid file prefix in the target file system 30 to which the source prefix name is mapped, such as "/doc/data". The mapped file reference is stored in the result file 46.

Returning to FIG. 2B, after mapping the original file reference the present logic as might be embodied in the user program 44 moves to block 78, wherein at least changed file content is retrieved from the server specified in the file reference and then stored in the target system 14, where the file reference comes from the input file 42, as provided by the propagation module 36. The present invention intends that only the file having the latest version in the current cycle is retrieved for storage at block 78, such that only the latest version that is consistent with the metadata being replicated ("the latest consistent version") is replicated. The changed files (or at least changed portions thereof) can be transferred using FTP. In one preferred embodiment, if a target file already exists for a file being replicated, the newer version is copied using another name, and then when the above-described Apply process propagates the new references to the target at block 82, the logic renames the newer version to have the same name the older version had. In this way, if the transaction crashes it can be aborted/rolled back and the file will be reverted to the original copy. Further details of a preferred implementation of this process is discussed further below in reference to FIG. 6.

At block 80, a DO loop is entered upon completion of copying all file changes from the source file system 16 to the target file system 30. Proceeding to block 82, the mapped file reference (instead of the original file reference of the source system 12) is propagated by the propagation module 36 to the target table 40, using the mapping tables shown in FIGS. 3 and 4.

FIG. 5 shows the details of mapping a file reference from the source DBMS 20 to the target DBMS 34. Commencing at block 84, a row is located in the server mapping table 62 that has a value in the server name column 66 that is equal to the file server portion of the file reference. Moving to block 86, the file server portion of the file reference is replaced with the value in the row's target name column 68. Next moving to block 88, a row is located in the file prefix mapping table 70 (FIG. 4) that has a value in the map ID column 72 that equals the value in the map ID column 64 of the row in the server mapping table 62 that was located at block 84. Also, the row selected at block 88 has the longest word match for the path name prefix of the file reference. At block 90, the matched portion of the pathname in the file reference is replaced with the value of the target prefix name column 76 in the row located at block 88 and then applied to the appropriate metadata row in the target DBMS 34, thereby mapping the file reference from the source system to the target system. If no match is found, the original prefix is used.

Figure 6:
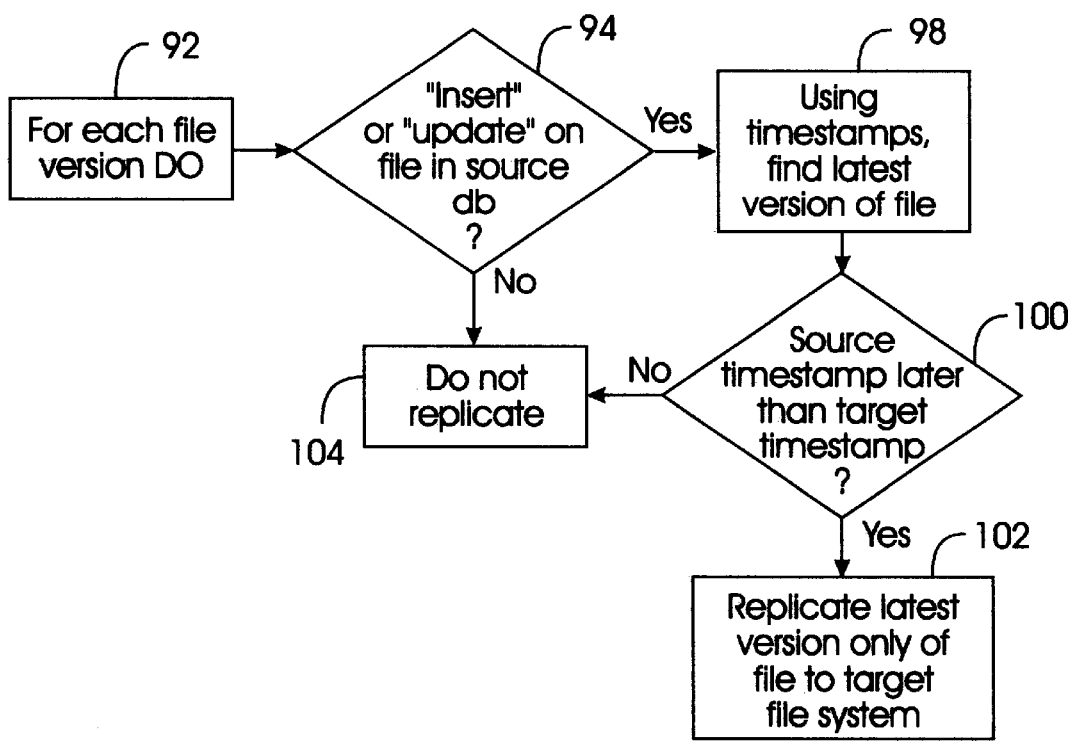
FIG. 6 is a flow chart showing the application logic for replicating a file to the target file system, while minimizing unnecessary copying.

Now referring to FIG. 6, the logic of the user program 44 in replicating files without unnecessary copying is shown. Commencing at block 92, for each version of a file contained in the input file 42, a DO loop is entered. Decision diamond 94 essentially represents the logic that unless an INSERT or UPDATE operation has been performed on the file reference of the file in the source DBMS 20, and the file itself has been changed, the file is not replicated.

If an INSERT or UPDATE operation has been performed on the reference to a file, and if the file itself has changed, the logic moves to block 98 to find the latest consistent version of the file in the input file 42, using file timestamps. If a file itself was changed as determined based on file modification timestamps, the logic at block 98 copies to the target file system only the latest consistent version of the file which is currently resided in the source file system, and which is archived in the early stage as described at block 49.

Proceeding to decision diamond 100, in a non-limiting embodiment it is determined whether the timestamp of the latest consistent version of the changed source file is later than the timestamp of the version of the file that is resident in the target file system 30. As intended herein, the timestamp of the file in the target system is the timestamp of the original source file that was copied over, which timestamp preferably is recorded in the target system for use in the comparison at decision diamond 100. Less preferably, a file system API can be invoked to change the timestamp of the target file to be equal to the timestamp of the original source file. Of course, for a new file the test at decision diamond 100 will be positive.

When the timestamp of the source version is later than that of the target version, indicating that the source file had been changed since the latest copy, the logic replicates the latest consistent version of the file to the target file system 30 at block 102. Otherwise, the file is not replicated, as represented by block 104.

It may now be appreciated that owing to the above-described synchronized replication of files between file systems and file references/metadata in the underlying DBMS, both data in the DBMS and data in the file systems are in a consistent state after replication. Moreover, the native interfaces for accessing the data at the various source and target sites is maintained.

While the particular SYSTEM AND METHOD FOR REPLICATING EXTERNAL FILES AND DATABASE METADATA PERTAINING THERETO as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for".

We claim:

1. A computer program product having computer usable means thereon executable by a digital processing apparatus to replicate files from a source file system linked to a source DBMS to a target file system linked to a target, comprising:
    computer readable code means for replicating at the target file system only a latest consistent version of a file at the source file system, only if the file has been changed at the source file system and an INSERT or UPDATE is performed on a column in the source DBMS referencing the file.

2. The computer program product of claim 1, further comprising computer readable code means for mapping at least one file reference from the source DBMS to the target.

3. The computer program product of claim 1, further comprising:
    computer readable code means for accessing at least a first mapping table, the first mapping table including at least a server mapping identifier column, a source name column, and a target name column; and
    computer readable code means for accessing at least a second mapping table, the second mapping table including at least a server mapping identifier column, a source file column, and a target file column.

4. The computer program product of claim 3, further comprising:
    computer readable code means for receiving a file reference with associated pathname and file server portion;
    computer readable code means for identifying a reference row in the first mapping table having a value in the source name column equal to a value of the file server portion of the file reference;
    computer readable code means for replacing the value of the source name column in the reference row with the value in the target name column in the reference row;
    computer readable code means for identifying a row in the second mapping table having a value in the server mapping identifier column equal to the value in the server mapping identifier column in the reference row and having, in the source prefix column, a value matching portion having a longest match with the pathname of the file reference; and
    computer readable code means for replacing the pathname with a value of the target prefix column in the row of the second mapping table.

5. A computer program product having computer usable means thereon executable by a digital processing apparatus, comprising:
    computer readable code means for mapping at least one file reference in a source DBMS to a target linked to a target file system; and
    computer readable code means for replicating at the target file system only a latest consistent version of a file at the source file system, only if the file has been changed at the source file system and an INSERT or UPDATE is performed on a column in the source DBMS referencing the file.

6. The computer program product of claim 5, further comprising:
    computer readable code means for accessing at least a first mapping table, the first mapping table including at least a server mapping identifier column, a source name column, and a target name column; and
    computer readable code means for accessing at least a second mapping table, the second mapping table including at least a server mapping identifier column, a source file column, and a target file column.

7. The computer program product of claim 6, further comprising:
    computer readable code means for receiving a file reference with associated pathname and file server portion;
    computer readable code means for identifying at least one reference row in the first mapping table having a value in the source name column equal to a value of the file server portion of the file reference;
    computer readable code means for replacing the value of the source name column in the reference row with the value in the target name column in the reference row;
    computer readable code means for identifying a row in the second mapping table having a value in the server mapping identifier column equal to the value in the server mapping identifier column in the reference row and having, in the source prefix column, a value matching portion having a longest match with the pathname of the file reference; and computer readable code means for replacing the pathname with a value of the target prefix column in the row of the second mapping table.

8. The computer program product of claim 7, further comprising:

computer readable code means for retrieving file content using the source file reference; and computer readable code means for storing the file content using the target file reference which is mapped from the source file reference using the mapping tables.

9. The computer program product of claim 5, further comprising:

means for determining whether a target copy in the target file system already exists for a target file in a source file system, and if so, copying the target file to the target file system as a newer target version using a name other than a name of the target copy.

10. The product of claim 9, comprising:

means for propagating the newer target version to the target file system; and means for renaming the newer target version to have the same name as the target copy.

11. A computer-implemented method for replicating data in at least one source system having a source file system linked to a source DBMS to at least one target system having a target file system linked to a target, comprising the acts of:

identifying a changed file in the source file system, the changed file having an associated file reference stored in the source DBMS;

replicating the changed file to the target file system and mapping the associated file reference to the target; and replicating at the target file system only a latest consistent version of a file at the source file system, and only when:

the file has been changed at the source file system; and an INSERT or UPDATE is performed on a column in the source DBMS referencing the file.

12. A computer-implemented method for replicating data in at least one source system having a source file system linked to a source DBMS to at least one target system having a target file system linked to a target, comprising the acts of:

identifying a changed file in the source file system, the changed file having an associated file reference stored in the source DBMS;

replicating the changed file to the target file system and mapping the associated file reference to the target;

generating a mapping of at least one file reference in the source DBMS to the target using at least one table, wherein the act of generating further includes:

accessing at least a first mapping table, the first mapping table including at least a server mapping identifier column, a source name column, and a target name column; and accessing at least a second mapping table, the second mapping table including at least a server mapping identifier column, a source file column, and a target file column.

13. The method of claim 12, wherein the replication of the changed file is synchronized with replicating a mapped file reference, to ensure that the state of the target file system is consistent with the state of the target.

14. The method of claim 12, wherein the act of replicating further includes:

receiving a file reference with associated pathname and file server portion;

identifying at least one reference row in the first mapping table having a value in the source name column equal to a value of the file server portion of the file reference;

replacing the value of the source name column in the reference row with the value in the target name column in the reference row;

identifying a row in the second mapping table having a value in the server mapping identifier column equal to the value in the server mapping identifier column in the reference row and having, in the source prefix column, a value matching portion having a longest match with the pathname of the file reference; and replacing the pathname with a value of the target prefix column in the row of the second mapping table.

15. The method of claim 12, wherein if a target copy in the target file system already exists for a target file being copied, the target file being copied is copied as a newer target version using a name other than a name of the forget copy.

16. The method of claim 15, comprising:

propagating the newer target version to the target file system; and renaming the newer target version to have the same name as the target copy.

17. A computer system, comprising:

at least one source file system;

at least one source DBMS linked to the source file system to provide management thereof;

least one target file system; and at least one target linked to the target file system to provide management thereof, changes in the source file system and underlying changes in the source DBMS being replicated to the target file system and target, respectively in synchronization; and at least one user program replicating at the target file system only a latest consistent version of a file at the source file system, only when:

the file has been changed at the source file system; and an INSERT or UPDATE is performed on a column in the source DBMS referencing the file.

18. The system of claim 17, further comprising at least one module mapping a file reference from the source DBMS to the target.

19. The system of claim 18, wherein the module is programmed with logic for undertaking method acts comprising:

receiving a file reference with associated pathname and file server portion;

identifying at least one reference row in a first mapping table having a value in a source name column equal to a value of the file server portion of the file reference;

replacing the value of the source name column in the reference row with a value of a target name in the reference row;

identifying a row in a second mapping table having a value in a server mapping identifier column equal to a value in a server mapping identifier column in the reference row and having, in a source prefix column, a value matching portion having a longest match with the pathname of the file reference; and replacing the pathname with a value of a target prefix column in the row of the second mapping table.

20. The system of claim 17, wherein if a target copy in the target file system already exists for a target file being copied, the target file being copied is copied as a newer target version using a name other than a name of the target copy.

21. The system of claim 20, wherein the system propagates the newer target version to the target file system, and renames the newer target version to have the same name as the target copy.

* * * * *